U. ANDERSON.
CUSHION TIRE AND RIM THEREFOR.
APPLICATION FILED FEB. 25, 1920.
1,421,755.
Patented July 4, 1922.
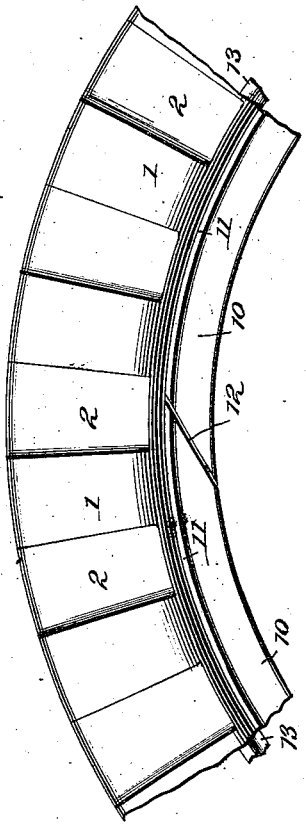
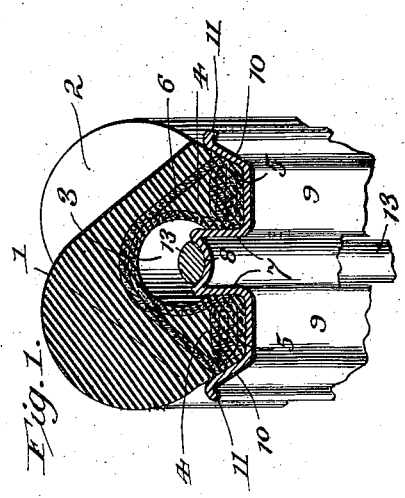
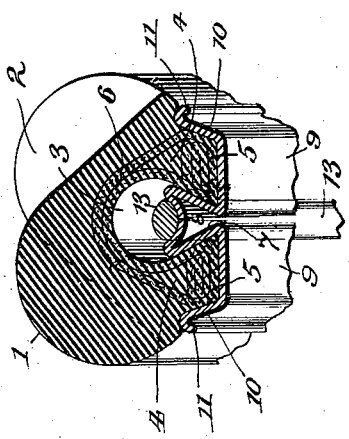
Inventor:
Ulrich Anderson,
By Dodge and Sons,
Attorneys

UNITED STATES PATENT OFFICE.

ULRICH ANDERSON, OF WAUSAU, WISCONSIN.

CUSHION TIRE AND RIM THEREFOR.

1,421,755.  Specification of Letters Patent.  Patented July 4, 1922.

Application filed February 25, 1920. Serial No. 361,086.

*To all whom it may concern:*

Be it known that I, ULRICH ANDERSON, a citizen of the United States, residing at Wausau, in the county of Marathon and State of Wisconsin, have invented certain new and useful Improvements in Cushion Tires and Rims Therefor, of which the following is a specification.

This invention pertains to an improved form of tire and rim for holding the same.

The present invention has for its main object the production of a novel form of cushion tire which by reason of its construction is quite resilient and possesses non-skid qualities to a considerable degree.

A further object of the invention is to provide a novel form of rim for holding the tire and bringing the same to its ultimate form ready for use.

The invention is illustrated in the annexed drawings, wherein:

Fig. 1 is a cross sectional view of the tire and rim in their initial form;

Fig. 2 a similar view showing the rim and tire brought to their ultimate operative relation; and Fig. 3 a side elevation of a portion of the tire and rim.

The tire is formed from a single piece of rubber molded and vulcanized to form. It may be said to be provided with a divided tread having a central circumferentially extending depression 1 and with a series of lateral recesses 2 on each side, those on one side being staggered with relation to those on the other. The tire on its under or inner circumferential face is formed with a channel or groove 3, thereby producing what may be termed oppositely disposed inwardly projecting feet or ribs 4, 4. A bead ring 5 may be located in each of said feet, the beads being preferably connected or tied together by suitable embedded fabric 6. The rim is formed with a centrally disposed circumferentially extending outwardly projecting double wall flange 7, the outer face whereof is concave or provided with a seat 8. Located to each side of said midrib or abutment is a channel formed by the lateral extensions 9 and the upwardly and outwardly flaring flanges 10, the edges 11 of which are slightly recurved to prevent chafing of the tire thereon. The rim is preferably formed from a section of stock rolled to form and the abutting ends are preferably scarfed or inclined as indicated at 12, Fig. 3. To prevent expansion of the rim, a continuous or one piece hoop or band 13 is placed within the seat 8 prior to the placement of the tire in position on the rim, as in Fig. 1. When the hoop and tire are so positioned the rim is subjected to facewise or lateral compression in a suitable hydraulic or other press which has the effect of translating the rim and tire from the form shown in Fig. 1 to that shown in Fig. 2. From a comparison of these figures it will be seen that the side walls of the central flange 7 are carried inwardly toward each other, or in other words are inwardly inclined toward the center line of the rim. At the same time the side flanges 11 are likewise carried inwardly but such flanges are maintained in their same angular relation, lying, when the parts come to their final position, substantially parallel to the then inwardly inclined walls of the central rib 7. The feet or flanges 4 of the tire will, during such compression of the rim, be likewise placed under compression and consequently firmly held or clamped between the inner rib 7 and the outer flanges 10 of the rim. Hoop 13 will, of course, prevent circumferential enlargement or deformation of the rim either during the compression of the rim to bring it to its final form, or when the rim is mounted in position on a wheel for use.

What is claimed is:

1. In combination with a tire having two inner circumferentially extending flanges; a transversely split rim having a centrally disposed double walled flange and an upstanding marginal flange at each side thereof, said flanges engaging and holding the flanges of the tire; and means for preventing expansion of the rim.

2. In combination with a tire having two inner circumferentially extending flanges; a transversely split trough-shaped rim having a centrally disposed circumferentially extending flange the side walls whereof incline inwardly toward the body of the rim thereby forming two channels in which the tire flanges are seated and held; and means coacting with the central flange to prevent expansion of the rim.

3. In combination with a tire having two inner circumferentially extending flanges; a transversely split rim having a centrally disposed double walled flange with a concave seat in its outer face, the walls inclining inwardly toward each other as they extend from said seat, the rim likewise having an upstanding marginal flange at each side thereof, said flanges together with the inner flange forming channels in which the said tire flanges are clamped and held; and a continuous ring located in the seat of the central flange.

4. In combination with a tire having two inwardly projecting circumferentially extending flanges; and a rim having two channels for the reception of said flanges, the flanges being held under compression within the channels by a narrowing of said channels.

5. In combination with a tire having two inwardly projecting circumferentially extending flanges; a transversely split rim having two channels for the reception of said flanges, the innermost wall of each channel being inwardly inclined toward the other, the flanges of the tire being seated and held under compression within said channels; and means acting on the rim to prevent expansion thereof.

In testimony whereof I have signed my name to this specification.

ULRICH ANDERSON.